Figure 2:
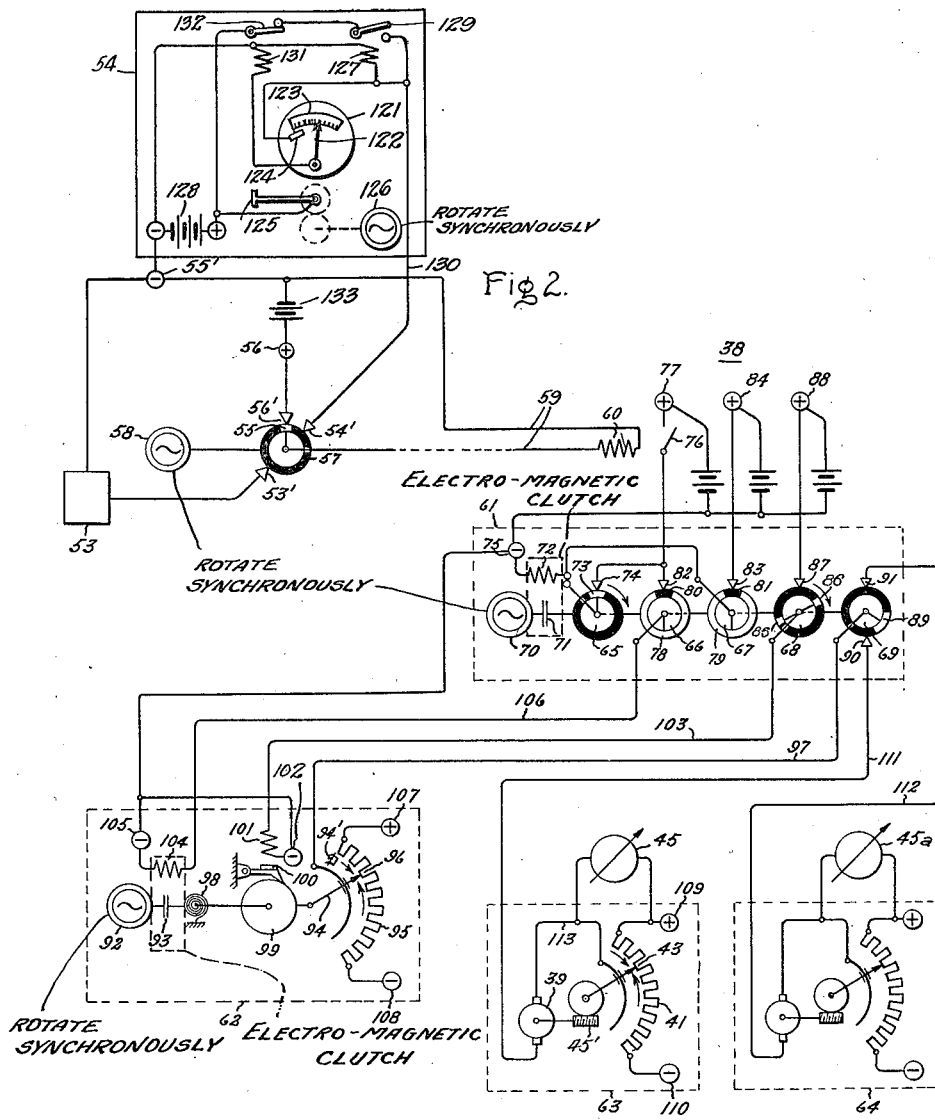

Nov. 17, 1936.  W. STABLEIN  2,061,410
TELEMETERING AND POSITION SIGNALING DEVICE AND SYSTEM
Filed Aug. 8, 1933  2 Sheets-Sheet 2

Inventor:
Wilhelm Stablein,
by Harry E. Dunham
His Attorney.

Patented Nov. 17, 1936

2,061,410

UNITED STATES PATENT OFFICE 2,061,410

TELEMETERING AND POSITION-SIGNALING DEVICE AND SYSTEM

Wilhelm Stablein, Berlin-Hermsdorf, Germany, assignor to General Electric Company, a corporation of New York Application August 8, 1933, Serial No. 684,241
In Germany August 24, 1932

10 Claims. (Cl. 177—351)

My invention relates to telemetering and position-signaling devices and systems, and concerns particularly multiple telemetering or the transmission of a plurality of indications.

It is an object of my invention to provide a telemetering system of the intermittent-impulse type in which the indicators of the receiving device remain unchanged in position in the intervals between impulses.

It is also an object of my invention to provide a telemetering system which may readily be adapted for summation of indications.

A further object of my invention is to provide a receiver for a telemeter of the impulse-duration type in which the indicators remain in a fixed position between impulses.

Another object of my invention is to provide an arrangement for transmitting indications by intermittent impulses in which a greater number of impulses may be used for transmitting certain indications than for others.

Other and further objects and advantages of my invention will be apparent as the description proceeds.

In accordance with my invention in its preferred form, I provide means for producing impulses dependent upon various quantities successively or in rotation, i. e. in sequence in repeated cycles, and means for transmitting the impulses over a single impulse transmitting channel. In the receiving station, I provide means made responsive in succession or in rotation to the transmitted impulses in such a manner that each receiving device produces indications corresponding to one of the indications to be transmitted. In order that the receiving indicators may preserve their positions in the intervals between the intermitting impulses and may not be affected by the interruptions in power in the intervals, means are provided in the receiving station for producing currents or voltages to simulate the indications to be transmitted and the receiving indicators are made responsive thereto.

The features of my invention which I believe to be novel and patentable will be pointed out in the claims appended hereto. For a better understanding of my invention itself, however, reference may be made to the following description taken in connection with the accompanying drawings in which Fig. 1 is a circuit diagram representing one embodiment of my invention, Fig. 2 is a circuit diagram representing a modification of the first embodiment suitable for use with telemetering systems of the impulse-duration type, and Fig. 3 is a simplified circuit diagram of the arrangement of Fig. 1.

Referring now more in detail to the drawings in which like reference characters refer to like parts throughout, I have shown multiple telemeters for transmitting to a distance the indications of two indicating devices. It will be understood, however, that my invention is applicable for transmitting any number of indications and that only two indicating devices are shown for the sake of simplifying the drawings and the description.

In the arrangement of Fig. 1 illustrating the use of my invention in connection with telemetering systems working on the direct-current intensity principle, indicating devices 11 and 12 at a transmitting station are arranged to produce currents dependent in magnitude upon the angular deflections of the pointers 13 and 14 respectively. Any suitable means for accomplishing this result may be employed, but for the sake of illustration I have shown an arrangement in which the pointers 13 and 14 are connected to rheostats 15 and 16 so as to make the resistances of rheostats 15 and 16 decrease as the pointers 13 and 14 deflect in a clockwise direction, thereby causing the currents flowing in the rheostats 15 and 16 to increase as pointers 13 and 14 deflect clockwise. Any desired means may be employed for transferring these currents alternately to a transmission line leading to a receiving station. For example, the rheostats 15 and 16 may be connected at one side to the positive terminal 17 of a source of direct current at the transmitting station and at the other side to the brushes 18 and 19 respectively, of a distributor 20. Distributor 20 is driven at a uniform speed in any desired manner as, for example, by means of a synchronous motor (not shown) connected to a source of constant or controlled frequency alternating current (not shown). The distributor 20 is provided with a revolving conducting segment 23 which is connected to one of the conductors 24 of a transmission line for transmitting impulses to a receiving station. A second conductor 25 of the transmission line is connected to the negative terminal 26 of the source of direct current.

At the receiving end, the conductor 24 is connected to rotating conducting segments 27 and 28 of distributors 29 and 30, arranged to be driven at the same speed as distributors 20, i. e. in synchronism therewith, by any suitable means such as, for example, a synchronous motor (not shown) connected to an alternating-current source (not shown) having the same frequency and phase relation as the source from which the distributor 20 is driven or, if desired, forming a part of the same alternating-current system.

Distributors 29 and 30 are also provided with brushes 33 and 34 for connecting the transmission line conductor 24 to a receiving device 35 of the receiving station and brushes 36 and 37 for connecting the conductor 24 to a receiving device 38 at the receiving station.

At the receiving station, there is provided for that the time duration of the connection of the lead 130 to a positive potential source depends upon the angular position of the pointer 122.

When the devices 53 and 54 are set in operation, they are arranged so that the brush 125 sweeps the upper half of its path while the corresponding brush of the device 53 sweeps the lower half of its path and vice versa. The devices 53 and 54 are thus arranged so as to produce their impulses alternately, and suitable means such as, for example, a distributor disk 57 driven by a synchronous motor 58 is employed for impressing the impulses of devices 53 and 54 alternately on a transmission line 59. The distributor 57 is provided with a revolving conducting segment 55 cooperating with brushes 53' and 54' connected to devices 53 and 54 respectively. The two-conductor transmission line 59 is connected to the revolving segment 55 and a negative terminal 55' of a source of direct current 133. The positive terminal 56 of the source 133 is connected to a brush 56' cooperating with distributor 57 to furnish starting signals. It will be understood that any number of indications may be transmitted by so arranging the apparatus that the impulses corresponding to the various readings are impressed in rotation upon the transmission line 59.

At the receiving station there is provided a relay 60 having its winding connected to the transmission line 59, a barrel switch 61, a receiver 62, and compensating devices 63 and 64, for translating the currents produced in the receiver 62 into continuous indications.

The barrel switch 61 consists of a plurality of disks 65, 66, 67, 68 and 69 driven by a synchronous motor 70 through an electromagnetic clutch 71, having an energizing winding 72. The motor 70 is driven by an alternating-current source having the same frequency as the source driving the motor 58 so that the two motors run synchronously. The disk 65 is provided with a conducting rotating segment 73 cooperating with a brush 74. The electromagnetic clutch winding 72 is connected between rotating segment 73 and the negative terminal 75 of a source of direct current. The brush 74 is connected through the relay contacts 76 of the relay 60 to the positive terminal 77 of a source of direct current. Disks 66 and 67 are provided with conducting rings 78 and 79, insulating segments 80 and 81, and cooperating brushes 82 and 83. Brush 82 is connected to brush 74 of disk 65, and brush 83 of disk 67 is connected to another source of positive potential 84. Disk 68 is provided with rotating conducting segments 85 and 86 here shown as two in number for the sake of simplicity, evenly spaced around the circumference of the disk, and a brush 87 cooperating with the segments 85 and 86. The brush 87 is also connected to a point 88 which is positive in potential with respect to terminal 75. Disk 69 is provided with a rotating conducting segment 89 which is slightly advanced in angle with respect to the segment 86 and a pair of brushes 90 and 91 is provided which cooperate with segment 89.

The receiver 62 comprises a synchronous motor 92 running synchronously with the motor 70 and connected through a magnetic clutch 93 to the rotatable arm 94 of a potentiometer 95. The rotating arm 94 carries a sliding contact 96 cooperating with the potentiometer 95 and connected through a conductor 97 to the rotating segment 89 of the disk 69 in the barrel switch 61. The rotating arm 94 is mechanically connected to a biasing device such as a spiral spring 98 and a ratchet 99. The ratchet 99 cooperates with a pawl 100 to prevent rotation of the ratchet 99 in a reverse direction. A releasing coil 101 for retracting pawl 100 is provided and is connected to the negative side 102 of a source of direct current and through conductor 103 to the rotating segments 85 and 86 of the disk 68 in the barrel switch 61. The magnetic clutch 93 is also provided with an actuating coil 104 connected to the negative side 105 of a source of direct current and through conductor 106 to the conducting ring 78 of the disk 66 in the barrel switch 61. The potentiometer 95 is connected between a positive terminal 107 and a negative terminal 108 of a source of direct current.

The compensating device 63 is of a type similar to the compensation type of receiving devices 35 and 38 shown in Fig. 1, and likewise comprises an electric motor 39 connected through a worm gear 45' to the movable tap 43 of a potentiometer 41. The potentiometer 41 is connected between the positive terminal 109 and negative terminal 110 of a source of direct current and the current-responsive device 45 is connected between terminal 109 and the tap 43 of the potentiometer 41. The motor 39 is also connected at one side to the potential tap 43 and is connected on the other side through a conductor 111 to the brush 90 of the distributor 69 in the barrel switch 61. The compensation device 64 is similar to the device 63 and is connected through the conductor 112 to the brush 91 of the distributor 69 in the barrel switch 61.

The motors, 58, 70, and 92 have been described as running synchronously but, obviously, the speed of the motor 92 need not be the same as that of the motor 70 provided the speed ratio is held constant, and the motors 58, 70, and 92 may be either synchronous motors or motors of any other suitable type arranged to run at unvarying speed.

The operation of the impulse-duration type of telemeter is as follows: When the rotating segment 55 of the distributor 57 at the transmitting station makes contact with the brush 56', a circuit is closed between the positive terminal 56 and the negative terminal 55', through the transmission line 59 and the relay 60, thereby producing a starting impulse in relay 60. The synchronous motor 70 is assumed to be running continuously and when the relay 60 is energized it closes its contacts 76 so that a circuit is closed from the positive terminal 77 through relay contacts 76, brush 74, segment 73 (which is stationary at this time), magnetic clutch coil 72, and negative terminal 75 thereby energizing the magnetic clutch 71 and setting the barrel switch 61 in rotation. When the segment 73 has passed the brush 74, the conducting ring 79 of the disk 67 makes contact with the brush 83 so that a circuit is maintained through the magnetic clutch winding 72 from positive terminal 84 through brush 83 and conducting ring 79, thereby causing the barrel switch 61 to continue in rotation for the remainder of the revolution.

While the relay contacts 76 are closed, a circuit is also formed from the positive terminal 77 through relay contact 76, brush 82, and conducting ring 78 of disk 66, conductor 106, and winding 104 of magnetic clutch 93, to a negative terminal 105, thereby mechanically connecting the potentiometer arm 94 and the ratchet 99 to the synchronous motor 92, which is also assumed to be running continuously. The arm 94 is consequently caused to rotate in a clockwise direction from the stop 94' which constitutes its initial position and continues to rotate as long as the relay contact 76 is closed, which is for the duration of the signaling impulse. Consequently, the angular position of the arm 94 and the difference in potential between potentiometer tap 96 and terminal 107 depend upon the duration of the impulse and the value of the indication to be transmitted.

The arm 94 remains at the position just attained until the barrel switch 61 has been rotated far enough to cause segment 85 of disk 68 to contact brush 87, closing a circuit from positive terminal 88 through brush 87, segment 85, conductor 103, pawl retracting winding 101, to negative terminal 102, thereby retracting pawl 100 and releasing ratchet 99 to permit biasing spring 98 to return the arm 94 to the initial position at the stop 94'.

The segment 85 of the disk 68 in the barrel switch 61 rotates beyond the brush 87 before the next impulse is received so that upon the reception of the next impulse when the relay contacts 76 are closed, a circuit is again formed from positive terminal 77 through winding 104 of the magnetic clutch 93 to negative terminal 105, and the potentiometer arm 94 rotates to a position corresponding to the duration of the second signal impulse. The foregoing operation is then repeated for a complete cycle of impulses in the case of systems for transmitting more than two indications until the barrel switch 61 has made a complete revolution and the circuit to the winding 72 of the magnetic clutch 71 is broken through the insulating segment 81 of the disk 67.

The potentials successively produced between tap 96 of potentiometer 95 and terminal 107 in response to successive impulses are translated into continuous indications by means of the compensating devices 63 and 64. When the first signal impulse has been received and the potentiometer arm 94 has reached the corresponding position, a circuit will be closed from the tap 96 which is at positive potential through conductor 97, rotating segment 89 of distributor 69, brush 90, conductor 111, motor 39, conductor 113, tap 43 which is also at positive potential, through potentiometer 41, to the negative terminal 110. The direction of current through the motor 39 will obviously depend upon whether potentiometer tap 96 or 43 is at higher potential, and the motor 39 is so connected that it will tend to rotate the tap 43 until the potential of the tap 43 has been adjusted to that of tap 96. The position of tap 43 and consequently the indication of the current-responsive device 45 connected between tap 43 and terminal 109 then corresponds to the indication to be transmitted. The conducting segment 89 of the distributor 69 is intentionally made wide enough to allow sufficient time for the motor 39 to adjust its tap 43 before the circuit to compensating device 63 through conductor 111 is broken at the distributor 69. It will be understood that the segments 85, 86, and 89 are so placed that the motor circuit through the conductor 111 is broken by the distributor 69 before the pawl 100 is retracted and the potentiometer arm 94 is released by the coil 101 being energized through the segments of the disk 68. Consequently, the taps 43 hold their positions in the intervals between current impulses.

At the reception of the second signal impulse of the cycle, the segment 89 of distributor 69 will contact brush 91 and the compensating device 64 will operate in a similar manner to produce an indication dependent upon the angular position of potentiometer arm 94 of the receiver 62 which in turn depends upon the indication to be transmitted.

Although I have for convenience shown an apparatus for transmitting two indications in which the distributor is arranged with brushes placed 180 degrees apart for the purpose of alternately adjusting indicators at the receiving station, it will be understood that the same principle may be employed in transmitting a greater number of indications, in which case the proper brushes and segments of the distributors would be evenly spaced around their peripheries and the impulses corresponding to each indication to be transmitted would be transmitted and received in sequence once during each cycle and would be repeated in successive cycles. It will be understood however that in case one or more of the indications to be transmitted tends to vary more rapidly than the others, or is of greater importance, the distributors and the other apparatus may be so arranged that more than one impulse is transmitted during each cycle to correspond to a given indication in order that the compensating device for that indication may be adjusted more frequently. This feature is equally applicable to either of the modifications shown in the drawings and described herein by way of illustration.

It will be seen that telemetric apparatus constructed in accordance with my invention has the advantage that it permits summation measurements to be obtained from a plurality of indications transmitted by intermittent impulses since it is not essential that the received indications to be added should have their producing impulses existing at the same time. Nor is it essential that the same system of transmission be used in transmitting the indications to be added.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A system for reproducing indications of a plurality of indicating devices which comprises a plurality of transmitter means for producing currents, each of a magnitude representing one of said indications, a transmission line, means for connecting said current-producing means to said transmission line in succession, a plurality of means for receiving said currents, means for connecting each of said receiving means to said transmission line in succession, said receiving means each comprising an electric motor, a receiver source of electric current, means for varying the strength of current obtained from said current source, and a current-responsive device connected to said receiver current source to indicate the magnitude of one of said indications to be transmitted, said source of current being connected to said motor in opposition to one of said transmitter current-producing means when said receiving means is connected to said transmission line, said motor being mechanically connected to said means for varying the strength of said receiver current and serving to vary said strength until said transmitter and receiver currents neutralize and the rotation of said motor ceases.

2. A system for reproducing a plurality of position indications which comprises means for producing successively intermittent currents, each of a magnitude representing one of said position indications, means for transmitting said currents, means for connecting said current-producing means to said current-transmitting means in succession, a plurality of means for receiving said currents, means for making each of said receiving means responsive to said transmitted currents in succession, said receiving means each comprising a current-responsive device, a source of receiver current, and means responsive to one of said transmitted currents for varying the strength of said receiver current to correspond to the strength of said transmitted current, said current-responsive device being connected to be responsive to the strength of said receiver current.

3. In a telemetering system of the impulse duration type adapted to transmit in succession to receiving apparatus impulses, each of a duration representing an indication to be reproduced, receiving apparatus therefor comprising means for initiating the operation of said receiving apparatus upon the reception of an impulse, means for producing intermittent currents dependent in magnitude in succession upon the time durations of said impulses, a plurality of variable strength receiver current sources supplying variable currents, means for successively adjusting the strengths of said sources so as to neutralize in succession said intermittent currents, and means responsive to the strengths of said current sources serving to provide continuous indications of the time durations of each of the successive impulses received by said apparatus.

4. A system for reproducing indications which comprises transmitter means for producing current adapted to vary in magnitude according to said indications, means for transmitting said current, means for receiving said current from said transmitting means, said receiving means comprising an electric motor, a receiver source of electric current, means for varying the strength of current obtained from said source, and a current-responsive device connected to said receiver source to produce indications corresponding to said indications to be reproduced, said source of current being connected to said motor in opposition to said transmitter current-producing means, said motor being mechanically connected to said means for varying the strength of said receiver current and serving to vary said strength until said transmitter and receiver currents neutralize and the rotation of said motor ceases.

5. In a telemetering system of the impulse duration type adapted to transmit to receiving apparatus impulses of a duration representing an indication to be reproduced, receiving apparatus therefor comprising means for producing intermittent current in impulses, each dependent in magnitude upon the time duration of the received impulses, a variable strength receiver current source supplying variable current, means for adjusting the strength of said source to neutralize said intermittent current, and means responsive to the strength of said source serving to provide a continuous indication of the time durations of the impulses received by said apparatus.

6. In a telemetering system, means for converting into a continuous indication an intermittent current impulse of a magnitude representing an indication to be reproduced comprising in combination with a suitable source of supply, a device for obtaining electric current of adjustable strength from said source, current-responsive means in which said intermittent current and said adjustable current act in opposition during the flow of said intermittent current for adjusting said adjustable current to cause said opposing currents to neutralize, and means responsive to said adjustable current for producing a non-intermittent indication of the magnitude of said intermittent current.

7. A system for reproducing a plurality of indications which comprises means for producing successively intermittent electric currents, each of a magnitude representing one of said indications, means for transmitting said currents successively, a plurality of devices for producing electric currents of adjustable strengths, current-responsive means in which said intermittent currents and said adjustable currents act in opposition for adjusting each of said adjustable currents to cause said opposing currents to neutralize, and means responsive to said adjustable currents for producing a plurality of non-intermittent indications each dependent upon one of said successively received intermittent currents.

8. A system for reproducing a plurality of variable indications which comprises means for producing in sequence intermittent current impulses, each of a magnitude representing one of said indications, means for transmitting said current impulses in sequence, a plurality of devices for obtaining electric currents of adjustable strengths, current-responsive means in which said intermittent currents and said adjustable currents act in opposition for adjusting each of said adjustable currents to cause said opposing currents to neutralize, and means responsive to said adjustable currents for producing a plurality of continuous indications each corresponding to one of said variable indications to be reproduced.

9. In a multiple telemetering system, means for converting into continuous indications intermittent current impulses, each of a magnitude representing one of the indications to be reproduced, comprising in combination with a suitable source of supply, a plurality of devices for obtaining electric currents of adjustable strength from said source, current-responsive means in which said intermittent currents and said adjustable currents act in opposition for adjusting each of said adjustable currents to cause said opposing currents to neutralize, and means responsive to said adjustable currents.

10. A system for reproducing indications which comprises means for producing intermittent electric current adapted to vary in magnitude to represent said indications, means for transmitting said current, a device for obtaining current of adjustable strength, current-responsive means in which said transmitted current and said adjustable current act in opposition for varying said adjustable current to cause said opposing currents to neutralize, and means responsive to said adjustable current for producing a non-intermittent indication corresponding to said indication to be reproduced.

WILHELM STABLEIN.

Feb. 16, 1937.  R. BARTHELEMY  2,070,774
METHOD OF RECEPTION OF ELECTRIC SIGNALING IMPULSES
Filed Sept. 22, 1934
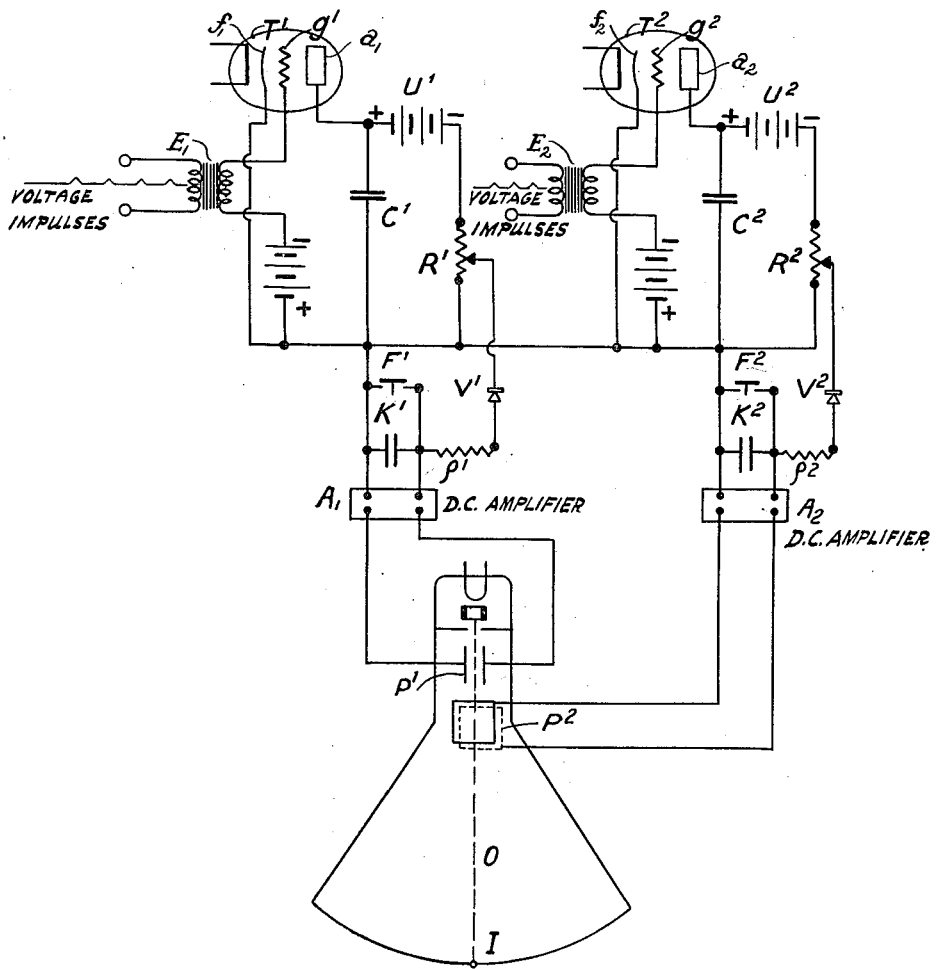
René Barthelemy
INVENTOR
By Otto Munk
his Atty.